2,788,309

RESERPINE COMPOSITION FOR PARENTERAL ADMINISTRATION

Jack Cooper, Summit, N. J., assignor to Ciba Pharmaceutical Products, Inc., Summit, N. J., a corporation of New Jersey No Drawing. Application September 3, 1954, Serial No. 454,211

4 Claims. (Cl. 167—67)

This invention relates to a liquid pharmaceutical composition comprising reserpine or the salts thereof suitable for parenteral administration.

Reserpine is a compound which is sold and used extensively as a hypotensive and tranquilizing agent. When administered orally, the effect of reserpine builds up slowly over a period from a few days to a few weeks. However, when it is desirable to obtain the effect of the drug as rapidly as possible, a form suitable for rapid absorption, for example, parenteral administration, is required.

Reserpine, as well as many salts thereof, are virtually insoluble to slightly soluble in water. When soluble reserpine salts are dissolved in water alone, the resulting solutions are rapidly dissociated or partially hydrolyzed with development of a precipitate thereby rendering such compositions unsunitable for parenteral administration. Accordingly, these compounds do not lend themselves readily to the formation of stable aqueous solutions suitable for parenteral administration. Although soluble in certain acid solutions, these compounds are relatively unstable under strongly acid conditions, e. g. pH 1–2. While reserpine is soluble in a number of organic solvents such as chloroform, benzyl alcohol, and ethyl acetate or acetic and phosphoric acids, these are not suitable solvents per se for parenteral use.

According to the present invention, it has been found that a pharmaceutical composition comprising reserpine or the salts thereof in a liquid pharmaceutical carrier in which the reserpine or salts are stable on storage and in a form suitable for parenteral administration, is prepared by dissolving reserpine or the salts in a vehicle which comprises a mixture of citric acid, benzyl alcohol, polyethyleneglycol and water. The components of the composition in general are employed in such proportions as to provide a parenterally administrable solution. The solutions are readily prepared, for example, by grinding together the reserpine or the salt thereof with the citric acid, adding the benzyl alcohol, followed by the successive addition of the polyethyleneglycol and water. Sterilization can be effected either by autoclaving or by bacteriological filtration. Polyethyleneglycol having a molecular weight of about 300, called in brief polyethyleneglycol 300, is preferably employed.

Especially suitable compositions are those in which the concentrations range approximately within the following limits:

Reserpine or its salts up to 0.33 part by weight (0.1 part by weight for the hydrochloride salt)
Citric acid, 0.2–0.5 part by weight
Benzyl alcohol, 2–3 parts by volume
Polyethyleneglycol 300, 4–20 parts by volume
Water, quantity sufficient to make 100 parts by volume.

Composition comprising the above ingredients are stable, non-hemolytic when administered intravenously, well tolerated when injected intramuscularly, and can be diluted with infusion fluids.

In the above, and in the examples below, parts by weight bear the same relation to parts by volume as grams to milliliters.

The following examples will serve to illustrate the invention:

Example 1

| | | |
|---|---|---|
| Reserpine | parts by weight | 0.25 |
| Citric acid | do | 0.25 |
| Benzyl alcohol | parts by volume | 2.0 |
| Polyethyleneglycol 300 | do | 10.0 |
| Water, q. s | do | 100 |

The reserpine and citric acid are ground together and the benzyl alcohol added. Most of the crystalline material dissolves and is completely dissolved on the addition of the polyethyleneglycol 300. The water is then added, the solution filtered, filled into ampuls or vials sealed and sterilized at 115° C. for 30 minutes. The pH of the finished solution is about 3.

Example 2

| | | |
|---|---|---|
| Reserpine hydrochloride | parts by weight | 0.1 |
| Citric acid | do | 0.25 |
| Benzyl alcohol | parts by volume | 2.0 |
| Polyethyleneglycol 300 | do | 10.0 |
| Water sufficient to make 100 parts by volume. | | |

The ingredients are mixed together and filled into ampuls or vials as described in Example 1.

Example 3

| | | |
|---|---|---|
| Reserpine sulfate | parts by weight | 0.25 |
| Citric acid | do | 0.25 |
| Benzyl alcohol | parts by volume | 2.0 |
| Polyethyleneglycol 300 | do | 10.0 |
| Water sufficient to make 100 parts by volume. | | |

The ingredients are mixed together and filled into ampuls or vials as described in Example 1.

What is claimed is:

1. A composition for parenteral administration comprising an aqueous solution containing up to about 0.33 part by weight of reserpine, about 0.2–0.5 part by weight of citric acid, about 2–3 parts by volume of benzyl alcohol, about 4–20 parts by volume of polyethyleneglycol, and sufficient water to make 100 parts by volume.

2. A composition for parenteral administration comprising an aqueous solution containing about 0.25 part by weight of reserpine, about 0.25 part by weight of citric acid, about 2 parts by volume of benzyl alcohol, about 10 parts by volume of polyethyleneglycol 300, and sufficient water to make 100 parts by volume.

3. A composition for parenteral administration comprising an aqueous solution containing about 0.1 part by weight of reserpine hydrochloride, about 0.25 part by weight of citric acid, about 2 parts by volume of benzyl alcohol, about 10 parts by volume of polyethyleneglycol 300 and sufficient water to make 100 parts by volume.

4. A composition for parenteral administration comprising an aqueous solution containing about 0.25 part by weight of reserpine sulfate, about 0.25 part by weight of citric acid, about 2 parts by volume of benzyl alcohol, about 10 parts by volume of polyethyleneglycol 300, and sufficient water to make 100 parts by volume.

References Cited in the file of this patent

Schlittler: "Uber das Alkaloid Serpentin aus Rauwolfia serpentina Benth.," Helvetica Chimica Acta, 1950, pp. 1463–1477, esp. at pp. 93 and 94.

(Other references on following page)

Carpenter: "Study of the Polyethylene Glycols as Vehicles for Intramuscular and Subcutaneous Injections," J. A. Pharm. Assn., Sci. Ed., January 1952, pp. 27-29.

"Glycol ... Solvent Aids Digitalis Shots," Drug Trade News, Jan. 19, 1953, p. 52.

Gourzis: "Alterations ... Following Rauwiloid, an Alkaloidal Extract of Rauwolfia serpentina," Proc. Soc. Exp. Biol. and Med., March 1954, pp. 463-466.

Steenhauer: "On Reserpine ...," Pharmaceutisch Weekblad, vol. 89, p. 161 et seq., March 13, 1954.